United States Patent [19]

Payne

[11] 4,138,161

[45] Feb. 6, 1979

[54] MECHANICAL POWDER FLOW DIVERTING DEVICE

[75] Inventor: Robert D. Payne, Countryside, Ill.

[73] Assignee: The Continental Group, Inc., New York, N.Y.

[21] Appl. No.: 823,028

[22] Filed: Aug. 9, 1977

[51] Int. Cl.[2] .............................................. B65G 53/56

[52] U.S. Cl. ...................................... 302/28; 118/312; 222/193; 239/124; 302/51

[58] Field of Search ....................... 302/27, 28, 63, 42, 302/51; 239/15, 124; 118/308, 310, 311, 312, 627, 629; 222/193; 137/610, 612, 874, 83; 141/131; 427/345, 181, 183, 236

[56] References Cited

U.S. PATENT DOCUMENTS

| | | | |
|---|---|---|---|
| 2,720,425 | 10/1955 | Coanda | 302/63 |
| 2,948,569 | 8/1960 | Bodner | 302/28 |
| 3,431,027 | 3/1969 | Kochey | 302/28 |
| 3,834,418 | 9/1974 | Clancy | 243/31 X |
| 4,025,664 | 5/1977 | Gerek et al. | 427/183 |

*Primary Examiner*—Robert W. Saifer
*Assistant Examiner*—James L. Rowland
*Attorney, Agent, or Firm*—Charles E. Brown

[57] ABSTRACT

A mechanical powder flow diverting device for use in conjunction with an apparatus for the electrostatic coating of can bodies which are sequentially positioned for receiving the powder coating. A switching device is provided so that powder is directed to the position of a can body to be coated only when a can body is located in that position. A return line returns the powder flow to the powder source during the time between can bodies. The switching device utilizes a readily bendable deflectable tube for diverting the powder flow between the coating apparatus and the return line and in order to prevent a backflow of powder during the switching, each of the lines receiving powder from the tube includes a vacuum flow transducer whereby the customary dead air resistance to flow of the powder-gas admixture is eliminated and, therefore, there is no blow back of powder during the switching operation.

10 Claims, 1 Drawing Figure

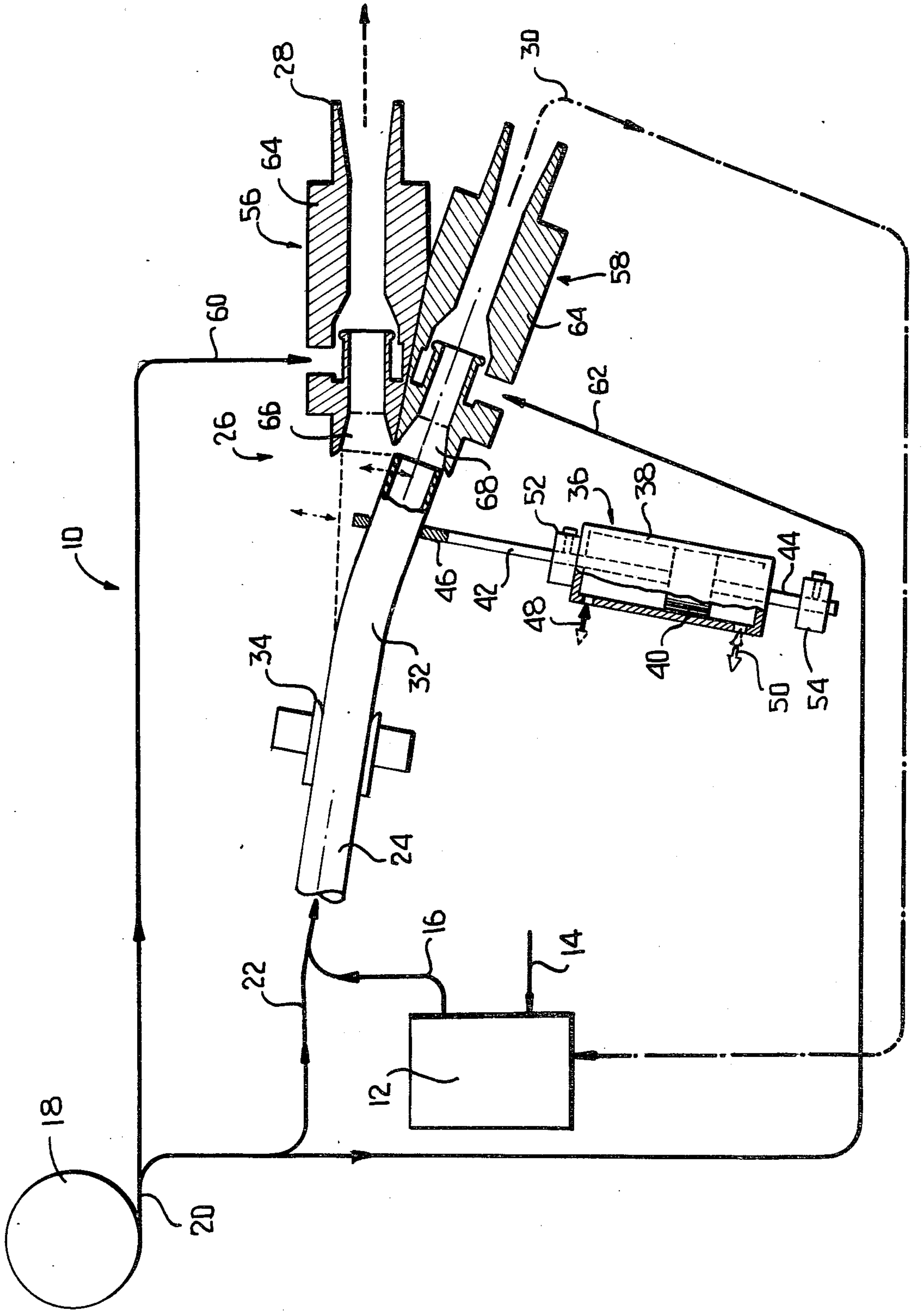
10
12
14
16
18
20
22
24
26
28
30
32
34
36
38
40
42
44
46
48
50
52
54
56
58
60
62
64
66
68

MECHANICAL POWDER FLOW DIVERTING DEVICE

This invention relates in general to new and useful improvements in apparatus for the electrostatic powder coating of individual members, such as can bodies, and more particularly to a switching device for use in conjunction with such apparatus to selectively flow a powder-gas admixture to either the coating apparatus or to a return line.

There has been previously developed apparatus for the sequential electrostatic coating of individual can bodies with such apparatus including flow diverting means operable so that when a can body is not in position for coating, the powder flow is diverted into a return line. Such an apparatus is the subject of U.S. Pat. No. 3,901,184 of Robert D. Payne and another.

It is pointed out here that the diverter is critical to the powder coating system operation because it switches powder either through the applicator when a can body is present for coating or back to the powder source during the time between can bodies. This switching prevents the unwanted spraying of powder on the outside of the can body during its transfer into and out of the coating station. It also provides a total control and containment of the powder coating material so that ultimately 99% of the material which enters the system may be utilized.

The pneumatic powder flow diverter of my prior U.S. Pat. No. 3,901,184 was purposely conceived and developed as a device with no moving parts because of concerns about powder build-up and powder degradation within a moving-part device. Low melting-point, fine powders, such as epoxies and acrylics, are known to impact-fuse within powder flow devices, especially between sliding surfaces. Powder build-up can continuously change the operating conditions or ultimately disable a powder flow device. Powder agglomerations (two or more powder particles stuck together), and powder attrition (fracture of a powder particle into two or more parts) can change the physical characteristics of the powder. A powder flow diverter with no moving parts was sought and developed as disclosed in my prior U.S. Pat. No. 3,901,184 to avoid these potential instabilities.

While the powder flow diverter of my prior U.S. Pat. No. 3,901,184 has proved to be operable, a simple mechanical diverter has been sought.

Mechanical diverters, primarily those with a shifting diverter line, in the past have proved impractical for two reasons. First of all, since the supply of the powder-gas or air admixture must be continuous, if a seal is attempted between the diverter line and the receiving line and return line, powder particles are entrapped between the two rubbing surfaces of the seal with the result that certain of the powder particles become degraded, the sealing surfaces become quickly worn, and frequently the seal is not complete. A second and more difficult problem is that when the flow of the powder-gas admixture is switched from one line to another, the flow meets the resistance of dead air within the inactive line. Until this previously stationary air can be accelerated out of the other end of the line, the incoming powder-gas admixture "sees" a back pressure and ejects some of the powder through the gap that at least temporarily exists between the end of the delivery line and the receiving line. It is for this reason in the past, simple mechanical switching devices or flow diverters have not been suitable for use in conjunction with the delivery of powders.

In accordance with this invention, there has been provided a switching device which includes a supply line having connected thereto a diverter line which is selectively alignable with a delivery line which is part of the coating system and a return line. The entrance end of each of the delivery line and return line is in the form of a vacuum flow transducer wherein air or gas is constantly flowing through the inlet end of each of the delivery line and return line whereby when the diverter line is suddenly shifted into alignment with one of the delivery line or return line which has previously been inactive, there is already a flow through that line corresponding generally to the volume of the powder-gas admixture flow so that there is no momentary build up of back pressure which normally results in powder blow out.

With the above switching mechanism, it is not necessary that the connection between the diverter line and the delivery line and return line be completely sealed, but a gap may be left so as to prevent powder from being trapped between the ends of the respective lines.

Another feature of the switching device is that the diverter line may be in the form of a flexible tube which may be rapidly diverted by a double acting linear fluid motor which is operable in a very short and substantially reducible time.

With the above, and other objects in view that will hereinafter appear, the nature of the invention will be more clearly understood by reference to the following detailed description, the appended claims and the single view illustrated in the accompanying drawing.

IN THE DRAWING

The single FIGURE of the drawing of this application is a schematic plan view with parts broken away in section and shows the relationship of the various components of the coating system and the flow switching device.

Referring now to the drawing in detail, it will be seen that there are illustrated the principal elements of an apparatus for the electrostatic coating of can bodies with a low melting-point fine powder, such as epoxies and acrylics. The apparatus, which is generally identified by the numeral 10, includes a powder source 12 which is coupled to a suitable powder supply by means of a powder line 14. A powder dispensing line 16 is also connected to the powder supply 12 for the continuous flow of powder from the powder supply.

The apparatus also includes a pump 18 for supply of a suitable gas. Preferably the gas is in the form of air which is oil free and has a low moisture content so as to be substantially dry. Of course, suitable inert gases may be utilized and the gases could be supplied therefor from a suitable pressurized source.

The pump 18 has an outlet 20 to which there is connected a supply line 22 which is coupled with the powder distributing line 16 with the air or other gas in the supply line 22 having the powder entrained therein. The powder-gas admixture is directed into a supply tube 24.

The supply tube 24 is part of a powder flow switching device, generally identified by the numeral 26. The switching device 26 includes a powder-gas admixture delivery line 28 which delivers the admixture to can bodies to be coated in a conventional manner. It is to be understood that the powder is electrostatically charged so that it will adhere to the surface of the can body. Although the powder application mechanism does not form a part of this invention, if a more thorough understanding of the coating operation is desired, reference may be had to my prior U.S. Pat. No. 3,901,184.

The apparatus also includes a return line 30 which is coupled to the powder supply 12 at such time as a can body is not in position to be coated.

Most specifically, the switching device 26 includes a readily flexible or bendable tube 32 which may be either integral with the supply tube 24 or coupled thereto. In any event, there is a support 34 which fixedly mounts the left portion of the tube 32 and provides for the controlled limited bending or flexing thereof.

In order to effect the shifting of the free end of the tube 32 in a switching operation, there is provided a double acting linear fluid motor, generally identified by the numeral 36. The fluid motor 36 includes a cylinder 38 having mounted therein for reciprocatory movement a piston 40. The piston 40 has extending from opposite ends thereof piston rods 42, 44 which extend out through opposite ends of the cylinder 38 in sealed relation. The end of the piston rod 42 remote from the piston 40 carries a yoke 46 which receives an end portion of the tube 32.

It is to be noted that the cylinder 38 is provided with suitable fittings 48, 50 which may sequentially function as supply and return lines. The motor 36 is preferably an air motor although it is feasible that it could be a hydraulic motor. However, air is preferred both because of the cost and the quick acting thereof.

In order that the yoke 46 may be accurately positioned in each direction of movement thereof, a collar 52 is carried by the piston rod 42 for engaging one end of the cylinder 38. A second collar 54 is carried by the piston rod 44 for engaging the opposite end of the cylinder 38. The collars 52, 54 may by accurately adjusted to control the position of the free end of the tube 32.

The inlet end of each of the delivery line 28 and the return line 30 is in the form of a vacuum flow transducer, the vacuum flow transducer for the delivery line 28 being generally identified by the numeral 56, while the vacuum flow transducer for the return line 30 is generally identified by the numeral 58. The transducers 56, 58 are identical and have supply lines 60, 62, respectively. It is to be understood that the transducers 56, 58 utilize a small amount of gas, preferably compressed air, to induce a relatively much larger flow through a body 64 of the transducer. For example, a transducer with a 0.375 inch inside diameter having an air flow of 3.7 standard cubic feet per minute 30 p.s.i. induces a flow of 13 cubic feet per minute through the transducer. Thus when gas is continuously supplied to the transducers 56, 58 there is a continuous gas flow therethrough. It is also to be understood that the induced flow should be comparable to the flow directed into the transducer through the diverter line 32.

At this time it is particularly pointed out that transducers of the type utilized as the transducers 56, 58 are available in a wide range of sizes from at least 0.90 inch to 2.0 inch and larger inside diameter. Thus the transducers make possible the use of the switching device over a very wide range of powder flow rates. It has been found that transducers manufactured by AIR-VAC ENGINEERING COMPANY, INC. of Milford, Connecticut, are fully satisfactory for the intended purpose. Vacuum flow transducer Models TDRH380 and 500 have been successfully used to date.

It is to be noted that the housings of the transducers 56, 58 have been machined so that they may be disposed in close fitting angular relation with the transducer 56 having an inlet 66 disposed immediately adjacent an inlet 68 of the transducer 58. Thus, in order to perform a complete switching operation, it is only necessary that the free end of the diverter line 32 be shifted a distance equal to its internal diameter. Further, since the connection between the fluid motor 36 and the diverter tube 32 is closer to the pivot point, the total movement of the fluid motor 36 is less than the internal diameter of the delivery tube 32.

It is to be understood that a seal is not effective between the free end of the delivery tube 32 and the inlets 66 and 68 of the transducers 56, 58. A gap on the order of 0.030 inch is purposely maintained so that powder cannot be trapped between two rubbing surfaces of the diverter tube 32 and the transducers. This gap eliminates the major defect (sliding surfaces in contact) of customary mechanical flow diverters of this general type.

It is to be understood that the switching device 26 is mainly determined by the response time of the fluid motor or air cylinder 36 and its associated controls. The switching device disclosed herein has been operated to switch powder at a rate equivalent to two hundred ten can bodies per minute. Powder flow was provided at 40 pounds per hour by the powder supply 12 which is a commercial powder dispenser. Using a helium-neon laser and associated detector in a conventional manner, the switching time of powder leaving either the transducer 56 or the transducer 58 was measured to be less than 0.030 seconds and reproducible within 0.004 second. This switching time and reproducibility is considered to be more than adequate for the available coating time of 0.190 second considering a coating of two hundred ten can bodies per minute.

Observation of the area at the end of the diverter tube 32 during operation, as well as observation of the surrounding area after extending operation, reveals no powder loss or fall-out from the gap between the diverter tube and the transducers.

During tests, the diverter tube 32 was a tube formed of polyethylene, and when the switching device was tested at a high rate corresponding to four hundred can bodies per minute, no heating or wear problems were found after four hours of operation at that rate.

Although the device is primarily intended for use in the coating of can bodies, it will be readily apparent that it is usable in any application requiring rapid and clean switching of a flowing powder stream.

Although only a preferred embodiment of the flow switching device has been specifically illustrated and described herein, it is to be understood that minor variations may be made therein without departing from the spirit and the scope of the invention as defined by the appended claims.

I claim:

1. For use in an apparatus for the sequential electrostatic coating of individual members, a flow switching device, said flow switching device comprising a supply line having a continuous powder-gas admixture supply, a delivery line for receiving the powder-gas admixture for directing the same against a member to coat the member with powder, a return line for receiving the powder-gas admixture when a member is not in position to be coated, a diverter line having one end continuously connected to said supply, switch means for selectively positioning the other end of said diverter line into alignment with said delivery line and said return line, said flow switching device being improved by said delivery line and said return line each having incorporated therein adjacent said diverter line means for providing continuous gaseous flow therethrough even when said diverter line is not associated therewith for eliminating the customary dead air resistance to flow of the powder-gas admixture when said diverter line is initially shifted into communication therewith.

2. The flow switching device of claim 1 wherein each of said means for providing continuous gaseous flow is in the form of a vacuum flow transducer.

3. The flow switching device of claim 2 wherein each vacuum flow transducer has a pressurized gas supply with the gas supplied to said vacuum flow transducers being of the same quality as that forming part of said powder-gas admixture.

4. The flow switching device of claim 3 wherein said gas is an oil free low moisture content substantially dry air.

5. The flow switching device of claim 1 wherein said switch means include said diverter line being in the form of a readily deflectable tube.

6. The flow switching device of claim 1 wherein said switch means include said diverter line being in the form of a readily deflectable tube, and a double acting linear fluid motor coupled to said tube for deflecting said tube.

7. The flow switching device of claim 1 wherein said switch means include said diverter line being in the form of a readily deflectable tube, said tube having a free end which is spaced from that one of said delivery line and said return line with which it is aligned.

8. The flow switching device of claim 1 wherein the apparatus includes a powder dispenser and said return line is coupled to said powder dispenser.

9. The flow switching device of claim 1 wherein said delivery line and said return line have axes arranged to insert along said diverter line.

10. The flow switching device of claim 1 wherein said delivery line and said return line have axes arranged to insert along said diverter line, said delivery line and said return line having inlets disposed immediately adjacent one another.

* * * * *